(No Model.)
D. BEST.
BLAST GOVERNOR FOR GRAIN CLEANERS.
No. 371,411. Patented Oct. 11, 1887.
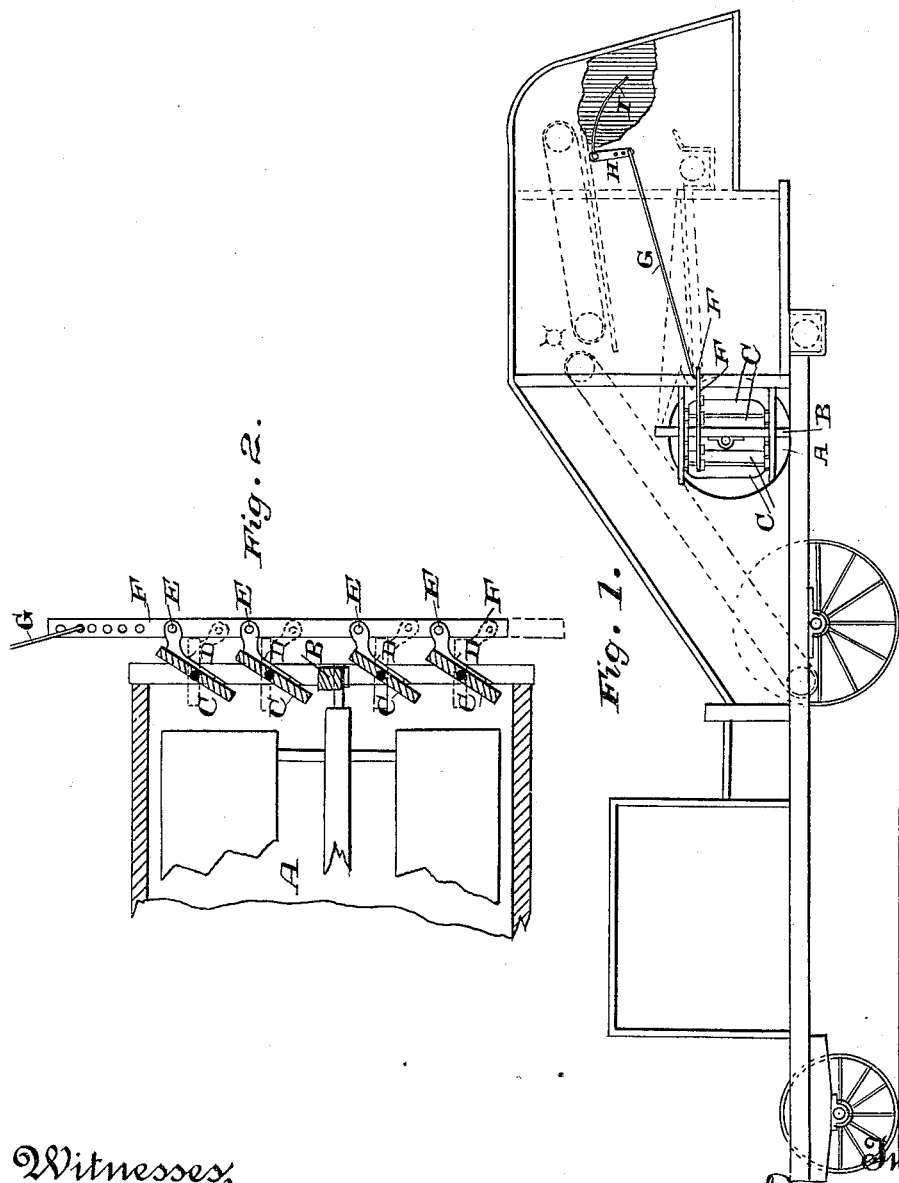
Witnesses,
Geo. H. Strong.
J. L. Morse.
Inventor,
Daniel Best,
By Dewey & Co.
attys

UNITED STATES PATENT OFFICE.

DANIEL BEST, OF SAN LEANDRO, CALIFORNIA.

BLAST-GOVERNOR FOR GRAIN-CLEANERS.

SPECIFICATION forming part of Letters Patent No. 371,411, dated October 11, 1887.

Application filed March 22, 1887. Serial No. 232,013. (No model.)

*To all whom it may concern:*

Be it known that I, DANIEL BEST, of San Leandro, Alameda county, State of California, have invented an Improvement in Blast-Governors for Grain-Cleaners; and I hereby declare the following to be a full, clear, and exact description of the same.

My invention relates to a governor for the blast of grain-cleaners; and it consists in the construction and combination of devices hereinafter described and claimed.

Referring to the accompanying drawings for a more complete explanation of my invention, Figure 1 is a side elevation of my device applied to the cleaning mechanism of a traveling header and thrasher. Fig. 2 is an end view of the shutters, showing their position with relation to the fan-casing, central post and extension-bars, and the connecting-rod.

A is the fan-casing of a grain-cleaning apparatus.

B is the central post at each end, in which the journals of the fan shaft are mounted.

C C are slats or shutters, which I have shown in the present case standing across the end of the opening through which air is admitted to the fan-casing when the fan is in motion. These shutters have pivot or journal pins at the top and bottom, and they have strengthening-bars D fixed across them at any suitable point. These bars have projecting ends, as shown at E, which are perforated to receive pins, by which they are united to the connecting rod or bar F, so that by the movement of this bar the shutters are all drawn in one direction or the other. When moved in one direction, they are closed, so as to prevent any air passing into the fan-casing, and when moved in the opposite direction they may be opened more or less until they stand with their edges parallel with the axis of the fan-shaft when they are opened to their greatest extent. When this occurs, the bar F, from its connection with the projections E, will strike the ends of the shutters, and will thus act as a stop to prevent their passing the point where they are opened the widest.

The bar F is connected by a rod, G, to a crank-arm, H, fixed upon the outer end of a shaft extending across the machine behind the cleaning-shoe. Upon this shaft is fixed a plate or board, I, which hangs downward from the shaft, and may be made of any suitable shape. In the present case I have shown it as curved, so as to form a cylindrical segment. This plate hangs downward, so as to stand in line with the air-blast passing out through the rear of the machine, and when the wind strikes this plate it swings it upward and backward, thus turning the crank-arm H and drawing the rod G of the bar F so as to turn the shutters and partially or wholly close the air-inlet in the end of the fan-casing if the blast becomes too strong. If the blast is reduced so as not to do good work, the weight of the plate will cause it to drop toward the perpendicular, and this will act through the crank-arm H and rod G to again open the shutters and allow more air to enter the fan-casing. By this construction I am enabled to produce an automatic governor which, when adjusted, will control the wind passing through the cleaning-shoe, so that the grain will be perfectly cleaned without being blown over and lost.

Having thus described my invention, what I claim as new, and desire to secure by Letters Patent, is—

The vertically-pivoted shutters extending across the air-inlet opening of a fan-casing having transverse bars and obliquely-projecting lugs, as shown, in combination with the uniting-bar pivoted to these lugs, so that they may be opened or closed simultaneously, the bar acting as a stop against the edges of the transverse bars in their open position, substantially as herein described.

In witness whereof I have hereunto set my hand.

DANIEL BEST.

Witnesses:
S. H. NOURSE,
H. C. LEE.